Patented July 17, 1951

2,561,177

UNITED STATES PATENT OFFICE 2,561,177

SILICON-CONTAINING RUBBER COMPOSITIONS

Arthur J. Barry, Midland, Mich., assignor to Dow Corning Corporation, Midland, Mich., a corporation of Michigan No Drawing. Application April 21, 1949, Serial No. 88,914

3 Claims. (Cl. 260—85.1)

The present invention is concerned with certain polymeric organosilicon compositions and their preparation.

Compositions in accordance herewith are hydropolyalkoxysilyl addition products of polyolefinic rubber hydrocarbons. These addition products comprise polymeric rubber hydrocarbons having alkoxy silyl radicals bonded to carbon atoms thereof by a carbon to silicon linkage. The rubber hydrocarbons include natural rubber, gutta percha, balata and elastomeric butadiene-styrene copolymers. The silyl radical is of the formula $SiR_n(OR')_{3-n}$ in which R represents a methyl or a phenyl radical, R' is an alkyl radical from methyl to propyl and $n$ is an integer from 0 to 1. The compositions of the present invention contain from one to 33 percent by weight of silicon based upon the carbon content thereof.

A process whereby certain silyl groups can be introduced into the molecule of a polymeric rubber hydrocarbon is described in my copending application Serial Number 45,204, filed jointly with De Pree and Hook, now Patent Number 2,475,122. In accordance with the method thereof, a mixture of a polyolefinic rubber hydrocarbon and a silane of the formula $R_mHSiCl_{3-m}$, where R is methyl or phenyl and $m$ is 0 or 1, is maintained at a temperature of from room temperature to 400° C. under sufficient pressure that at least a portion of the reaction mixture is in liquid phase. From 0.1 to 2.0 molecules of silane per olefinic linkage in the hydrocarbon is employed. An addition product is obtained which contains silicon atoms bonded to carbon atoms of the rubber hydrocarbon, and hydrolyzable chlorine atoms attached to the silicon atoms. When less than one mol of silane per double bond is reacted with the rubber, the resultant addition product contains residual olefinic linkages. Use of silane in higher proportions results in a product which contains few or no olefinic linkages.

The hydro-polyalkoxysilyl addition products of rubber hydrocarbons of the present invention are conveniently prepared by reacting the above described hydro-polychlorosilyl addition products with an alkoxysilane or an alcohol. It is preferred to employ alcohols in which the organic radical contains less than four carbon atoms. If desired, the reaction mixture may be dispersed in a diluent such as toluene. The reaction proceeds satisfactorily when a mixture of the hydro-polychlorosilyl rubber addition product and the alkoxy compound is maintained at a reflux temperature. When an alcohol is used as the source of alkoxy radicals, hydrogen chloride forms and is allowed to escape from the reaction mixture. When an alkoxysilane such as trimethylethoxysilane, $(CH_3)_3SiOC_2H_5$, is employed, the corresponding chlorosilane is produced, and may be separated from the product.

When the hydro-polyalkoxysilyl addition product of rubber contains few or no double bonds in the hydrocarbon portion of the molecule, the product hydrolyzes to a hard, resinous body. When the composition contains double bonds, the hydrolysis product is elastomeric and may be vulcanized, as with sulfur. These latter hydrolysis products are miscible with organic elastomers, and may be blended therewith to produce novel compositions.

Hydro-polyalkoxysilyl addition products of rubber are also of utility as waterproofing agents, varnishes and film forming materials. They may be applied in solution to and hydrolyzed in contact with cellulosic materials. Paints may be prepared from the compositions by pigmentation thereof.

These compositions are desirable since their use does not entail the liberation of hydrogen chloride which is detrimental in some applications.

Example 1

A mixture of 326 grams trichlorosilane, 194 grams Hevea braziliensis in the form of smoked sheet (1 molecule silane per double bond), and 374 grams benzene was heated in a 2.4 liter bomb for 16 hours at 299°–307° C. During the heating period the maximum pressure developed within the bomb was 1120 pounds per square inch. The bomb was cooled, and the reaction product was discharged and heated on a steam bath under reduced pressure to remove volatile components. The residual addition product was soluble in benzene.

186.7 grams of a 52% solution of the hydrotrichlorosilyl rubber addition product in benzene were mixed with 100 ml. dry toluene. To the resultant solution, ethanol was added in amount of 80 ml. over a period of 10 minutes. During the addition heat was evolved whereby the temperature of the reaction mixture rose to 45° C. Hydrogen chloride which formed was allowed to escape throughout the run. The mixture was heated under reflux for 20 minutes at a pot temperature of 75° C. Low boiling compounds were removed by distillation at a pot temperature of 164° C. A brown liquid was obtained as a residual product. It contained 13.7% silicon based upon the carbon content, and 33.24% ethoxyl.

The hydro-polyethoxysilyl addition product of the rubber was applied as a coating to sheet glass, mahogany, and steel panels. After exposure to moisture, the coatings dried to hard, strongly adhering films.

Example 2

77.3 grams of a 52% solution in benzene of the hydro-trichlorosilyl rubber addition product described in Example 1, were mixed with 30 ml. benzene and 20 ml. toluene. 70 ml. absolute methanol were then added over a period of 1.5 hours. The reaction mixture was heated for 1 hour under reflux and subsequently on a steam bath to volatilize low boiling components. A dark brown, viscous liquid was obtained as residual product. It contained 25% silicon based on the carbon content, was substantially free of chlorine and contained 24.0% methoxyl. Films of this hydromethoxysilyl addition product of rubber were applied to sheet glass, mahogany and steel panels. Hard, strongly adherent coatings were produced.

Example 3

76.1 grams of a 52% solution in benzene of the hydro-trichlorosilyl rubber addition product described in Example 1 were mixed with 30 ml. of benzene and 20 ml. toluene. 130 ml. of absolute n-propanol were added gradually over a period of one hour. The reaction mixture was then heated for one hour under reflux, after which the solvent was removed under reduced pressure. The brown residual liquid contained 15.4% silicon based on the carbon content, was substantially free of chlorine, and contained propoxy radicals.

Example 4

A mixture of 30 ml. of benzene and 20 ml. of toluene was added to 73 grams of a 52% solution in benzene of the hydro-trichlorosilyl rubber addition product of *Hevea braziliensis* of Example 1. Approximately 75 grams of trimethylethoxysilane were then added slowly after which the reaction mixture was heated for 1.5 hours. Subsequently, the solvent and trimethylchorosilane were removed by distillation. The residual hydro-triethoxysilyl addition product of rubber was a brown viscous material.

Example 5

A mixture of 32.6 grams of trichlorosilane, 194 grams *Hevea braziliensis* in the form of smoked sheet (1 molecule silane per 10 double bonds) and 750 grams of benzene was heated in a bomb of 2.4 liter capacity for 16 hours at a temperature of from 299° to 302° C. The reaction product was soluble in benzene.

To 189.4 grams of a 50% solution of the hydro-trichlorosilyl rubber addition product in benzene was added a mixture of 50 ml. benzene and 25 ml. toluene. 100 ml. absolute ethanol were then added with stirring. The reaction mixture was heated under reflux for one hour, after which the low boiling components were distilled off on a steam bath. The residual product was a viscous, dark brown liquid which contained 1.49% silicon based on the carbon content, was substantially free of chlorine and contained ethoxyl radicals. Films of this hydro-triethoxysilyl addition product of rubber were applied to mahogany, sheet glass and steel panels. A non-tacky film was obtained without any discoloration due to acid.

Example 6

A mixture of 276 grams of methyldichlorosilane, 194.5 grams of *Hevea braziliensis* in the form of smoked sheet (1 molecule silane per double bond) and 374 grams of benzene was heated in a 2.4 liter bomb at a temperature of from 295° to 300° C. for 16 hours, during which time the maximum pressure was 915 pounds per square inch. The major portion of the reaction product was soluble in benzene.

Absolute alcohol in amount of 300 ml. was added added slowly with stirring to 361 grams of a 50% solution of this hydro-methyldichlorosilyl rubber addition product in benzene. The reaction mixture was heated with refluxing for 1.5 hours after which the low boiling components were removed by distillation. The residual hydro-methyldiethoxysilyl addition product of rubber was a dark brown liquid. It was substantially free of chlorine and contained 14.9% silicon based on its carbon content, and 19.04% ethoxyl.

Example 7

A mixture of 425 grams phenyldichlorosilane, 194 grams of *Hevea braziliensis* in the form of smoked sheet (1 molecule silane per double bond), and 322 grams of benzene was heated in a 2.4 liter autoclave at a temperature of from 296° to 308° C. for 16 hours during which time the maximum pressure was 500 pounds per square inch. The major portion of the reaction product was a dark brown, viscous liquid.

25.7 grams of the hydro-phenyldichlorosilyl rubber addition product was dispersed in a mixture of 100 ml. benzene and 50 ml. toluene. 50 ml. absolute ethanol were then added slowly. The reaction mixture was heated under reflux for one hour, after which solvent was distilled off on a steam bath. The distillation residue was a viscous brown liquid and was a hydro-phenyldiethoxysilyl addition product of the rubber.

Example 8

A mixture of 326 grams of trichlorosilane, 194 grams of an unvulcanized GR–S type rubber (75 butadiene-25 styrene copolymer), and 374 grams of benzene was heated in a 2.4 liter bomb for 16 hours at an average temperature of from 298° to 302° C., and a maximum pressure of 810 pounds per square inch. The major portion of the reaction product was a brown, very viscous liquid.

The addition product was reacted with absolute ethanol in a mixed benzene-toluene solution. The resultant hydro-triethoxysilyl addition product of the GS–R rubber was a viscous brown material.

Example 9

A mixture of 67.8 grams trichlorosilane, 40.5 grams of gutta percha in the form of smoked sheet (1 molecule silane per double bond), and 78 grams of benzene was heated in a bomb of 0.5 liter capacity for 16.5 hours at a temperature of from 287° to 300° C., and a maximum pressure of 800 pounds per square inch. The resultant addition product was soluble in benzene.

81.3 grams of a 50% solution in benzene of the hydro-trichlorosilyl addition product of gutta percha was mixed with 50 ml. of toluene. 60 ml. of absolute ethanol were added slowly, after which the reaction mixture was heated under reflux at a pot temperature of 74° C. for about an hour. The product was concentrated by heating to a pot temperature of 80° C. at 60 mm. pressure. The resultant hydro-triethoxysilyl addition product of gutta percha contained 27.42 percent ethoxyl.

Example 10

When a mixture of 41 grams of balata, 31 grams of trichlorosilane, and 117 grams of benzene are heated in a 0.5 liter bomb for 16 hours at 275°–300° C., and the reaction product is subsequently reacted with 46 grams of absolute ethanol, a hydro-triethoxysilyl addition product of balata is obtained.

That which is claimed is:

1. A hydro-polyalkoxysilyl addition product of a rubber hydrocarbon selected from the group consisting of natural rubber, gutta percha, balata and elastomeric butadiene-styrene copolymers, which addition product contains radicals of the formula $SiR(OR')_2$, wherein R represents a radical of the group consisting of methyl and phenyl radicals and R' is an alkyl radical from methyl to propyl, said radicals being bonded to carbon radicals of the rubber hydrocarbon by carbon to silicon linkages.

2. The product of claim 1, wherein R represents a methyl radical and R' represents an ethyl radical.

3. A hydro-polyalkoxysilyl addition product of a rubber hydrocarbon selected from the group consisting of natural rubber, gutta percha, balata, and elastomeric butadiene-styrene copolymers, which addition product contains polyalkoxysilyl radicals of the formula $SiR(OR')_2$, wherein R represents a radical of the group consisting of methyl and phenyl radicals and R' is an alkyl radical from methyl to propyl, said radicals being bonded to carbon atoms of the rubber hydrocarbon by carbon to silicon linkages, and which contains sufficient of said radicals that the addition product contains from 1 to 33 per cent silicon based on the carbon content thereof.

ARTHUR J. BARRY.

REFERENCES CITED

The following references are of record in the file of this patent:

UNITED STATES PATENTS

| Number | Name | Date |
|---|---|---|
| 2,413,582 | Rust et al. | Dec. 31, 1946 |
| 2,462,640 | Hyde | Feb. 22, 1949 |
| 2,469,154 | Bunnell et al. | May 3, 1949 |
| 2,475,122 | Barry et al. | July 5, 1949 |